(12) United States Patent
Jin et al.

(10) Patent No.: US 12,377,768 B2
(45) Date of Patent: Aug. 5, 2025

(54) CUP HOLDER ASSEMBLY AND VEHICLE HAVING SAME

(71) Applicant: NIO TECHNOLOGY (ANHUI) CO., LTD, Hefei (CN)

(72) Inventors: Yinzhu Jin, Shanghai (CN); Haobin Zhang, Shanghai (CN); Tao Wang, Shanghai (CN); Yutao Gong, Shanghai (CN); Wuwei Li, Shanghai (CN); Guishan Du, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 145 days.

(21) Appl. No.: 18/176,886

(22) Filed: Mar. 1, 2023

(65) Prior Publication Data
US 2023/0278479 A1   Sep. 7, 2023

(30) Foreign Application Priority Data
Mar. 2, 2022 (CN) .......................... 202210199530.8

(51) Int. Cl.
*B60N 3/10* (2006.01)

(52) U.S. Cl.
CPC .................................. *B60N 3/102* (2013.01)

(58) Field of Classification Search
CPC .................................. B60N 3/102; B60N 3/10
See application file for complete search history.

(56) References Cited

U.S. PATENT DOCUMENTS

| | | | |
|---|---|---|---|
| 6,272,890 B1 * | 8/2001 | Huston | E05B 17/185 70/423 |
| 10,596,947 B2 * | 3/2020 | Smithson | B60N 3/105 |
| 2017/0258252 A1 * | 9/2017 | Sawada | A47G 23/0216 |
| 2019/0084463 A1 * | 3/2019 | Boundy | B60N 3/102 |

FOREIGN PATENT DOCUMENTS

| | | | | |
|---|---|---|---|---|
| CN | 214492664 U | * | 10/2021 | |
| CN | 113815509 B | * | 12/2022 | ............. B60N 3/106 |
| CN | 219382284 U | * | 7/2023 | |

* cited by examiner

*Primary Examiner* — Derek J Battisti
(74) *Attorney, Agent, or Firm* — Sheridan Ross P.C.

(57) ABSTRACT

The disclosure relates to a cup holder assembly and a vehicle having the cup holder assembly. The cup holder assembly comprises: a mounting barrel having a circumferential wall extending in a vertical direction and a top opening obliquely extending downwards from a front portion of the mounting barrel to a rear portion of the mounting barrel, the circumferential wall enclosing an accommodating cavity extending in the vertical direction; a synchronizer disc arranged in the accommodating cavity; a cup holder rotatably fixed to the synchronizer disc and having an axis of rotation extending in a width direction of the cup holder; a lifting mechanism connected to the synchronizer disc; and an angle adjusting mechanism configured to be connected to each of the cup holder, the synchronizer disc, and the lifting mechanism, so that the cup holder is rotatable about the axis of rotation while rising and lowering in the vertical direction, so as to move between an inclined initial position in which the cup holder is located at the top opening and a horizontal operating position in which the cup holder is located in the accommodating cavity. The vehicle according to the disclosure has practicability of placing an item, and can meet personalized and aesthetic requirements of an appearance design.

12 Claims, 7 Drawing Sheets

CUP HOLDER ASSEMBLY AND VEHICLE HAVING SAME

CROSS-REFERENCE TO RELATED APPLICATIONS

This application claims the benefit of China Patent Application No. 202210199530.8 filed Mar. 2, 2022, the entire contents of which are incorporated herein by reference in its entirety.

TECHNICAL FIELD

The disclosure relates to the technical field of vehicles, and in particular to a cup holder assembly and a vehicle having the cup holder assembly.

BACKGROUND

As one of the most common configurations of vehicle interiors, a cup holder is usually mounted on an auxiliary instrument panel between a driver's seat and a passenger seat, with a main function of placing a cup or another item. The cup holder can be designed not only to place an item, but also to play a certain role in beautification and decoration.

Currently, cup holders in the prior art are of multiple types mainly including a fixed type, a lifting type, a roller shutter type, a turnover type, etc. A cup holder in a lifting cup holder can move up and down in a cavity for accommodating a cup, so that the cup holder can close the cavity for an aesthetic effect when idle, and is hidden in the cavity when operating, to support the cup. For example, a Chinese utility model patent no. CN 213973730 U discloses a lifting cup holder for a vehicle. The lifting cup holder for a vehicle comprises components such as a shell of a substantially cup-shaped structure, a lifting support plate arranged in the shell in a liftable manner, a buffer assembly in linkage connection with the lifting support plate to slow down the movement of the lifting support plate, and a lift assembly. The lift assembly is provided with an annular connecting end abutting against an annular limiting ring located on a lower end face of the lifting support plate. The lifting support plate cannot translate in a horizontal direction relative to the annular connecting end, so that the lifting support plate and the annular connecting end are fixed together by means of the annular limiting ring, thereby preventing the lifting support plate from moving in a non-vertical direction.

As mentioned in the above utility model patent, the lifting cup holder in the prior art extends substantially in the horizontal direction in an idle state and an operating state, and a profile angle of the cup holder cannot be adjusted, so that it is difficult to meet personalized and aesthetic requirements for vehicle interiors.

Thus, a new technical solution is needed in the art to solve the above problem.

BRIEF SUMMARY

In order to solve the technical problem in the prior art that a profile angle of a lifting cup holder cannot be changed, the disclosure provides a cup holder assembly. The cup holder assembly comprises: a mounting barrel having a circumferential wall extending in a vertical direction and a top opening obliquely extending downwards from a front portion of the mounting barrel to a rear portion of the mounting barrel, the circumferential wall enclosing an accommodating cavity extending in the vertical direction; a synchronizer disc arranged in the accommodating cavity; a cup holder rotatably fixed to the synchronizer disc and having an axis of rotation extending in a width direction of the cup holder; a lifting mechanism connected to the synchronizer disc; and an angle adjusting mechanism configured to be connected to each of the cup holder, the lifting mechanism, and the synchronizer disc, so that the cup holder is rotatable about the axis of rotation while rising and lowering in the vertical direction, so as to move between an inclined initial position in which the cup holder is located at the top opening and a horizontal operating position in which the cup holder is located in the accommodating cavity.

The cup holder assembly according to the disclosure comprises components such as the mounting barrel, the synchronizer disc, the cup holder, the lifting mechanism, and the angle adjusting mechanism. The mounting barrel has the circumferential wall extending in the vertical direction and the top opening obliquely extending downwards from the front portion of the mounting barrel to the rear portion thereof. The circumferential wall encloses the accommodating cavity also extending in the vertical direction, to accommodate an item such as a cup. The synchronizer disc is arranged in the accommodating cavity, so as to cooperate with another component. The cup holder rotatably covers the synchronizer disc and has the axis of rotation extending in the width direction of the cup holder. The lifting mechanism is configured to be connected to the synchronizer disc, so that the cup holder fixed to the synchronizer disc can move up and down in the accommodating cavity. The angle adjusting mechanism is configured to be connected to each of the cup holder, the lifting mechanism, and the synchronizer disc, so that the cup holder is rotatable about the axis of rotation while rising and lowering in the vertical direction. With the above arrangement, the cup holder can move between an inclined initial position in which the cup holder is located at the top opening of the mounting barrel and a horizontal operating position in which the cup holder is located in the accommodating cavity. In other words, the cup holder can be adjusted in the profile angle while rising and lowering. Specifically, when the cup holder is in the initial position, the cup holder is located at the top opening of the mounting barrel, so that the top opening can be conveniently closed, and an inclined cup holder profile can also meet personalized and aesthetic requirements of an appearance design, thereby improving a user's sensory experience. When the cup holder is in the operating position, the cup holder extends substantially in a horizontal direction, and can stably support an item such as a cup, so as to achieve a function of placing the item.

In a preferred technical solution of the cup holder assembly described above, the angle adjusting mechanism comprises: a planetary gear which is rotatably fixed to a bottom wall of the synchronizer disc and which comprises a conical tooth portion fitting with the lifting mechanism and a first circumferential tooth portion extending along a circumferential edge of the conical tooth portion; a sun gear which is rotatably fixed to the bottom wall and which comprises a second circumferential tooth portion meshing with the first circumferential tooth portion and an annular wall extending along a central axis of the second circumferential tooth portion; and a connector which is fixed to the annular wall in a liftable manner and which is provided with a first rotating shaft pivotally connected to the cup holder. By means of the cooperation between the conical tooth portion of the planetary gear and the lifting mechanism, the lifting mechanism can synchronously drive the planetary gear to rotate during movement. Further, by means of the cooperation between the first circumferential tooth portion in the planetary gear and the second circumferential tooth portion in the sun gear, the sun gear can be synchronously driven to rotate. The connector is fixed to the annular wall of the sun gear in a liftable manner, and the first rotating shaft pivotally connected to the cup holder is also arranged on the connector, so that the sun gear drives the connector to rise and lower in the annular wall during rotation, thereby driving the cup holder to move relative to the bottom wall of the synchronizer disc, so as to adjust the profile angle of the cup holder.

In a preferred technical solution of the cup holder assembly described above, the planetary gear further comprises an annular protrusion extending outwards in a radial direction of the first circumferential tooth portion, and the bottom wall is provided with a first limiting claw and a second limiting claw which are respectively positioned on two sides of the annular protrusion and which are capable of restricting the annular protrusion. With the above arrangement, the planetary gear can be prevented from being dislocated during rotation, so as to ensure the reliability of components.

In a preferred technical solution of the cup holder assembly described above, a spiral sliding slot is formed in the annular wall, and a slider restricted in the sliding slot is arranged on the connector. With the above arrangement, the rotation of the sun gear can enable the connector to rise and lower, thereby driving the profile angle of the cup holder to change.

In a preferred technical solution of the cup holder assembly described above, the sliding slot comprises a first sliding slot and a second sliding slot that are opposite each other, and the slider comprises a first slider fitting with the first sliding slot and a second slider fitting with the second sliding slot. With the above arrangement, the connector can be stressed more evenly.

In a preferred technical solution of the cup holder assembly described above, a recess extending perpendicularly downwards is formed in the bottom wall, and the sun gear is rotatably fixed in the recess. With the above arrangement, the sun gear can be more stably arranged on the synchronizer disc.

In a preferred technical solution of the cup holder assembly described above, the second circumferential tooth portion has a greater diameter than the first circumferential tooth portion. The diameter of the second circumferential tooth portion is set to be greater than that of the first circumferential tooth portion, so that a rotation speed of the sun gear is relatively low to meet process requirements for angle adjustment.

In a preferred technical solution of the cup holder assembly described above, a first lug and a second lug that are respectively located on a left side and a right side are formed on an upper portion of the connector, the first rotating shaft comprises two rotating shaft portions which are separated from each other, and the two rotating shaft portions are circular shafts which are respectively arranged on the first lug and the second lug and which extend in opposite directions. With the above arrangement, the connector can have a stable and simple structure and is easily processed.

In a preferred technical solution of the cup holder assembly described above, a second rotating shaft extending along the axis of rotation is positioned on the bottom wall close to the rear portion or the front portion, and a first support seat which is fixable to two ends of the first rotating shaft and a second support seat fixed to two ends of the second rotating shaft are formed on a lower portion of the cup holder. By means of the cooperation between the second rotating shaft and the second support seat, the cup holder can be pivotally connected to the synchronizer disc. In addition, the first rotating shaft and the first support seat are arranged, such that the profile angle of the cup holder can be conveniently adjusted under the driving of the angle adjusting mechanism. The change in the position of the second rotating shaft can also enrich types of products and meet diversified requirements of users.

In a preferred technical solution of the cup holder assembly described above, the lifting mechanism comprises a lifting gear shaft fixed to the circumferential wall in a liftable manner, the lifting gear shaft is rotatably fixed to the synchronizer disc, and a bevel gear which can mesh with the conical tooth portion is arranged on the lifting gear shaft. With the above arrangement, the lifting mechanism can have a simple structure and is convenient to process.

In a preferred technical solution of the cup holder assembly described above, a front wall of the circumferential wall is provided with a front lifting guide slot extending in the vertical direction and a front lifting rack facing the front lifting guide slot, a rear wall of the circumferential wall is provided with a rear lifting guide slot parallel to the front lifting guide slot and a rear lifting rack facing the rear lifting guide slot; and the lifting gear shaft is provided with a shaft body extending through the front lifting guide slot and the rear lifting guide slot, and two ends of the shaft body are respectively provided with a front lifting gear meshing with the front lifting rack and a rear lifting gear meshing with the rear lifting rack. With the above arrangement, it is possible to conveniently enable the synchronizer disc to rise and lower in the accommodating cavity, thereby driving the cup holder fixedly connected to the synchronizer disc to rise and lower.

In a preferred technical solution of the cup holder assembly described above, an included angle formed between the initial position and the operating position is a predetermined angle, and the predetermined angle is less than or equal to 15°. With the above arrangement, it is possible to prevent an excessive predetermined angle which cannot meet design requirements.

In order to solve the technical problem in the prior art that a profile angle of a lifting cup holder cannot be changed, the disclosure further provides a vehicle. The vehicle comprises a cup holder assembly according to any one of the above embodiments. By adopting the cup holder assembly according to any one of the above embodiments, the vehicle according to the disclosure can obtain a lifting cup holder, the lifting cup holder can move between an inclined initial position and a horizontal operating position, so that personalized and aesthetic requirements of an appearance design are met while the practicality of placing an item is taken into account, thereby improving the beauty of vehicle interiors.

Solution 1:

1. A cup holder assembly, comprising:
   a mounting barrel having a circumferential wall extending in a vertical direction and a top opening obliquely extending downwards from a front portion of the mounting barrel to a rear portion of the mounting barrel, the circumferential wall enclosing an accommodating cavity extending in the vertical direction;
   a synchronizer disc arranged in the accommodating cavity;
   a cup holder rotatably fixed to the synchronizer disc and having an axis of rotation extending in a width direction of the cup holder;
   a lifting mechanism connected to the synchronizer disc; and an angle adjusting mechanism configured to be connected to each of the cup holder, the synchronizer disc, and the lifting mechanism, so that the cup holder is rotatable about the axis of rotation while rising and lowering in the vertical direction, so as to move between an inclined initial position in which the cup holder is located at the top opening and a horizontal operating position in which the cup holder is located in the accommodating cavity.

Solution 2:

2. The cup holder assembly according to solution 1, wherein the angle adjusting mechanism comprises:
   a planetary gear which is rotatably fixed to a bottom wall of the synchronizer disc and which comprises a conical tooth portion fitting with the lifting mechanism and a first circumferential tooth portion extending along a circumferential edge of the conical tooth portion;
   a sun gear which is rotatably fixed to the bottom wall and which comprises a second circumferential tooth portion meshing with the first circumferential tooth portion and an annular wall extending along a central axis of the second circumferential tooth portion; and
   a connector which is fixed to the annular wall in a liftable manner and which is provided with a first rotating shaft pivotally connected to the cup holder.

Solution 3:

3. The cup holder assembly according to solution 2, wherein the planetary gear further comprises an annular protrusion extending outwards in a radial direction of the first circumferential tooth portion, and the bottom wall is provided with a first limiting claw and a second limiting claw which are respectively positioned on two sides of the annular protrusion and which are capable of restricting the annular protrusion.

Solution 14:

4. The cup holder assembly according to solution 2, wherein a spiral sliding slot is formed in the annular wall, and a slider restricted in the sliding slot is arranged on the connector.

Solution 5:

5. The cup holder assembly according to solution 4, wherein the sliding slot comprises a first sliding slot and a second sliding slot that are opposite each other, and the slider comprises a first slider fitting with the first sliding slot and a second slider fitting with the second sliding slot.

Solution 6:

6. The cup holder assembly according to solution 2, wherein a recess extending perpendicularly downwards is formed in the bottom wall, and the sun gear is rotatably fixed in the recess.

Solution 7:

7. The cup holder assembly according to solution 2, wherein the second circumferential tooth portion has a greater diameter than the first circumferential tooth portion.

Solution 8:

8. The cup holder assembly according to solution 2, wherein a first lug and a second lug that are respectively located on a left side and a right side are formed on an upper portion of the connector, the first rotating shaft comprises two rotating shaft portions which are separated from each other, and the two rotating shaft portions are circular shafts which are respectively arranged on the first lug and the second lug and which extend in opposite directions.

Solution 9:

9. The cup holder assembly according to solution 2, wherein a second rotating shaft extending along the axis of rotation is positioned on the bottom wall close to the rear portion or the front portion, and a first support seat which is fixable to two ends of the first rotating shaft and a second support seat fixed to two ends of the second rotating shaft are formed on a lower portion of the cup holder.

Solution 10:

10. The cup holder assembly according to solution 2, wherein the lifting mechanism comprises a lifting gear shaft fixed to the circumferential wall in a liftable manner, the lifting gear shaft is rotatably fixed to the synchronizer disc, and a bevel gear which can mesh with the conical tooth portion is arranged on the lifting gear shaft.

Solution 11:

11. The cup holder assembly according to solution 10, wherein
   a front wall of the circumferential wall is provided with a front lifting guide slot extending in the vertical direction and a front lifting rack facing the front lifting guide slot, and a rear wall of the circumferential wall is provided with a rear lifting guide slot parallel to the front lifting guide slot and a rear lifting rack facing the rear lifting guide slot; and
   the lifting gear shaft is provided with a shaft body extending through the front lifting guide slot and the rear lifting guide slot, and two ends of the shaft body are respectively provided with a front lifting gear meshing with the front lifting rack and a rear lifting gear meshing with the rear lifting rack.

Solution 12:

12. The cup holder assembly according to solution 1, wherein an included angle formed between the initial position and the operating position is a predetermined angle, and the predetermined angle is less than or equal to 15°.

Solution 13:

13. A vehicle, comprising a cup holder assembly according to any one of solutions 1 to 12.

BRIEF DESCRIPTION OF THE SEVERAL VIEWS OF THE DRAWINGS

Preferred implementations of the disclosure are described below with reference to accompanying drawings, in which.

LIST OF REFERENCE SIGNS

Figure 1:
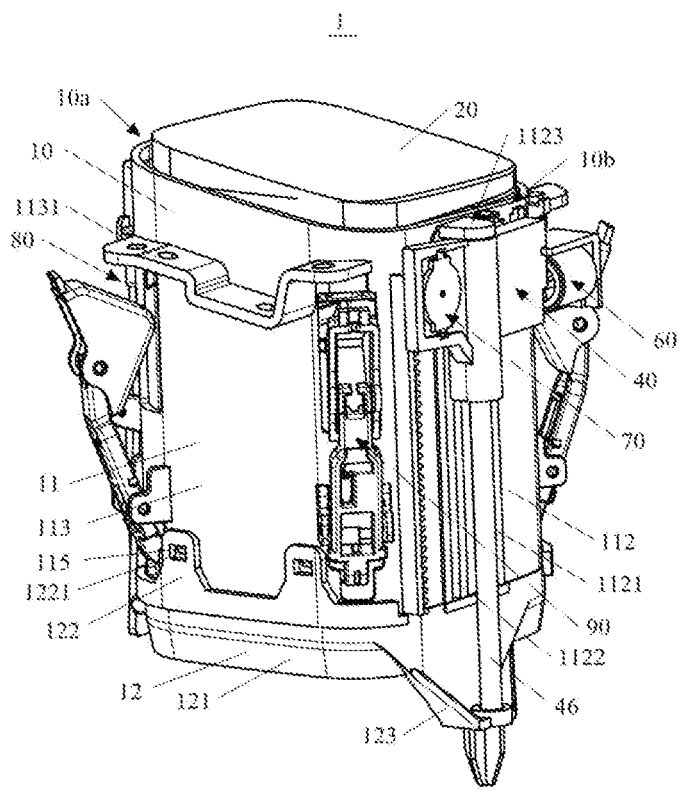
FIG. 1 is a first schematic structural diagram of an embodiment of a cup holder assembly according to the disclosure.

1. Cup holder assembly; 10. Mounting barrel; 10a. Front portion; 10b. Rear portion; 11. Circumferential wall; 111. Front wall; 1111. Front lifting guide slot; 1112. Button opening; 112. Rear wall; 1121. Rear lifting guide slot; 1122. Connecting block guide slot; 1123. Upper guide rod mounting base; 113. Left wall; 1131. Left mounting support; 114. Right wall; 1141. Right mounting support; 115. Snap-fit block; 116. Upper through hole; 117. Lower through hole; 12. Base; 121. Base body; 122. Skirt; 1221. Snap-fit hole; 123. Lower guide rod mounting base; 124. Bottom plate; 1241. Through hole; 13. Top opening; 14. Accommodating cavity; 20. Cup holder; 21. Cup holder body; 22. Cup holder peripheral wall; 23. First support seat; 24. Second support seat; 25. Avoidance recess; 30. Synchronizer disc; 31. Bottom wall; 311. Second rotating shaft; 312. Second rotating shaft mounting base; 313. Recess; 3131. Mounting hole; 32. Synchronizer disc peripheral wall; 321. Front shaft hole; 322. Rear shaft hole; 40. Lifting mechanism; 41. Lifting gear shaft; 411. Shaft body; 412. Front lifting gear; 413. Rear lifting gear; 414. Bevel gear; 42. Front lifting rack; 43. Front cover plate; 44. Rear lifting rack; 45. Connecting plate; 46. Guide rod; 47. Guide sleeve; 48. Connecting block; 50. Angle adjusting mechanism; 51. Planetary gear; 511. Conical tooth portion; 512. First circumferential tooth portion; 513. Annular protrusion; 514. Shaft hole; 515. Planetary gear rotating shaft; 516. Reinforcing rib; 517. First limiting claw; 518. Second limiting claw; 52. Sun gear; 521. Second circumferential tooth portion; 522. Annular wall; 5221. Sliding slot; 5221a. First sliding slot; 5221b. Second sliding slot; 523. Arc-shaped base; 524. Sun gear rotating shaft; 525. Fixing block; 53. Connector; 531. Columnar body; 532. Slider; 533. First lug; 534. Second lug; 535. First rotating shaft; 5351. Circular shaft; 60. Reset mechanism; 61. Coil spring; 611. First fixed end; 62. Coil spring fixing block; 63. Coil spring mounting support; 631. Winding rod; 70. Buffer mechanism; 71. Buffer gear; 72. Buffer rack; 73. Buffer gear mounting support; 80. Locking mechanism; 81. Locking member; 82. Locking plate; 821. Locking plate body; 822. Locking hole; 823. Limiting block; 824. Spring connecting block; 83. Locking plate limiting plate; 84. Reset spring; 85. Spring mounting plate; 86. Control rod; 861. Control rod body; 862. Control rod support seat; 87. Switch button; 90. Clamping mechanism; 90a. Clamping connecting rod; 91. Upper connecting rod; 92. Lower connecting rod; 921. Lower connecting rod body; 93. Connecting rod support seat.

DETAILED DESCRIPTION

Preferred implementations of the disclosure are described below with reference to the accompanying drawings. Those skilled in the art should understand that these implementations are only used to explain the technical principles of the disclosure, and are not intended to limit the scope of protection of the disclosure.

It should be noted that, in the description of the disclosure, the terms that indicate the direction or positional relationship, such as "upper", "lower", "left", "right", "inner", and "outer", are based on the direction or positional relationship shown in the figures, which is merely for ease of description instead of indicating or implying that the device or element must have a particular orientation and be constructed and operated in a particular orientation, and therefore, should not be construed as limiting the disclosure. Furthermore, the terms "first" and "second" are used for descriptive purposes only, and cannot be understood as indicating or implying relative importance.

In addition, it should also be noted that, in the description of the disclosure, the terms "arrange" and "connect" should be interpreted in a broad sense unless explicitly defined and limited otherwise. For example, a connection may be a fixed connection, a detachable connection, or an integral connection; and may be a direct connection, an indirect connection by means of an intermediate medium, or internal communication between two elements. For those skilled in the art, the specific meanings of the above-mentioned terms in the disclosure can be interpreted according to the specific situation.

In order to solve the technical problem in the prior art that a profile angle of a lifting cup holder cannot be changed, the disclosure provides a cup holder assembly 1. The cup holder assembly 1 comprises: a mounting barrel 10, the mounting barrel 10 having a circumferential wall 11 extending in a vertical direction and a top opening 13 obliquely extending downwards from a front portion 10a of the mounting barrel 10 to a rear portion 10b of the mounting barrel 10, and the circumferential wall 11 enclosing an accommodating cavity 14 extending in the vertical direction; a synchronizer disc 30, the synchronizer disc 30 being arranged in the accommodating cavity 14; a cup holder 20, the cup holder 20 being rotatably fixed to the synchronizer disc 30 and having an axis of rotation extending in a width direction of the cup holder 20; a lifting mechanism 40, the lifting mechanism 40 being connected to the synchronizer disc 30; and an angle adjusting mechanism 50, the angle adjusting mechanism 50 being configured to be connected to each of the cup holder 20, the synchronizer disc 30, and the lifting mechanism 40, so that the cup holder 20 is rotatable about the axis of rotation while rising and lowering in the vertical direction, so as to move between an inclined initial position in which the cup holder is located at the top opening 13 and a horizontal operating position in which the cup holder is located in the accommodating cavity 14.

Herein, the term "axis of rotation" refers to a central axis of a second rotating shaft 311, unless explicitly stated otherwise.

Figure 2:
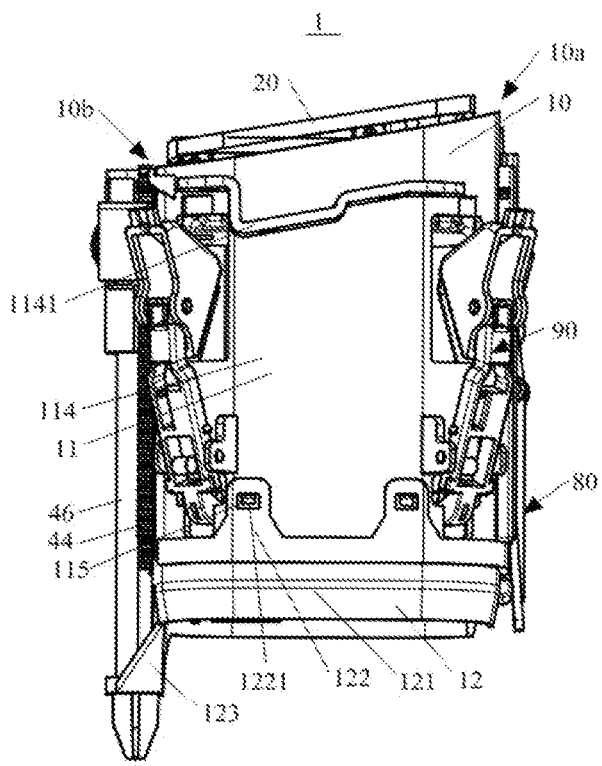
FIG. 2 is a second schematic structural diagram of an embodiment of the cup holder assembly according to the disclosure.
Figure 3:
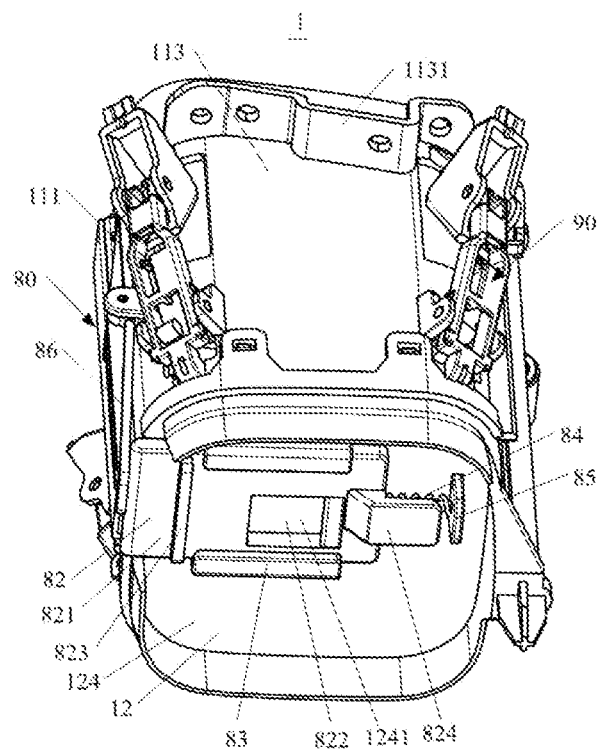
FIG. 3 is a third schematic structural diagram of an embodiment of the cup holder assembly according to the disclosure.
Figure 4:
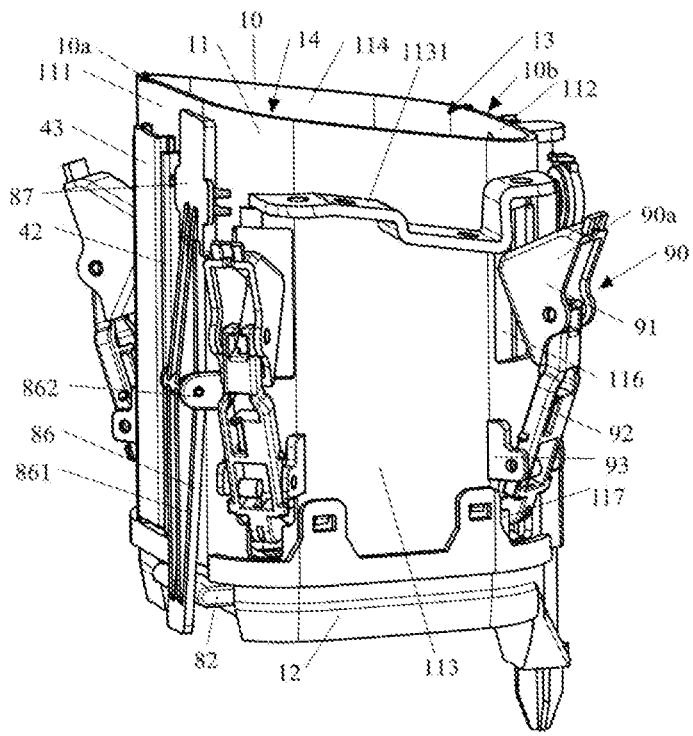
FIG. 4 is a first schematic structural diagram of an embodiment of the cup holder assembly according to the disclosure with a cup holder removed.
Figure 5:
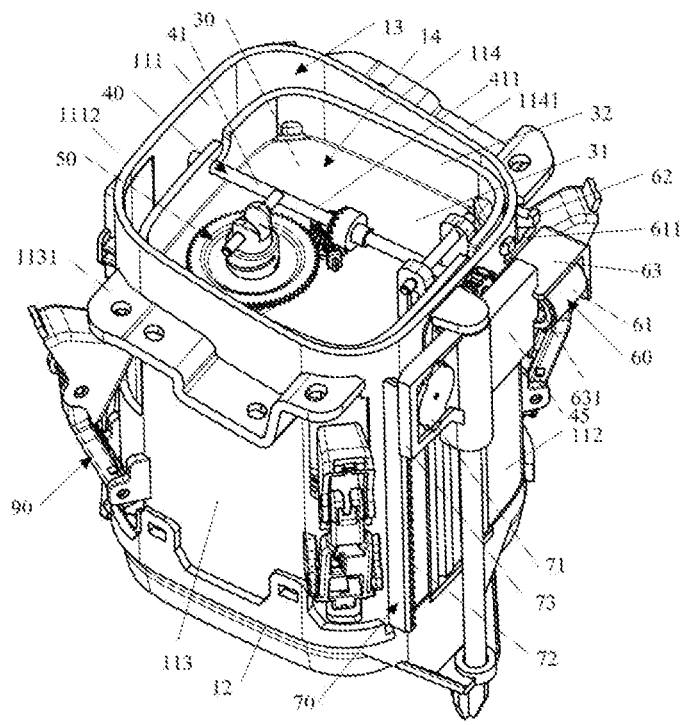
FIG. 5 is a second schematic structural diagram of an embodiment of the cup holder assembly according to the disclosure with the cup holder removed.
Figure 6:
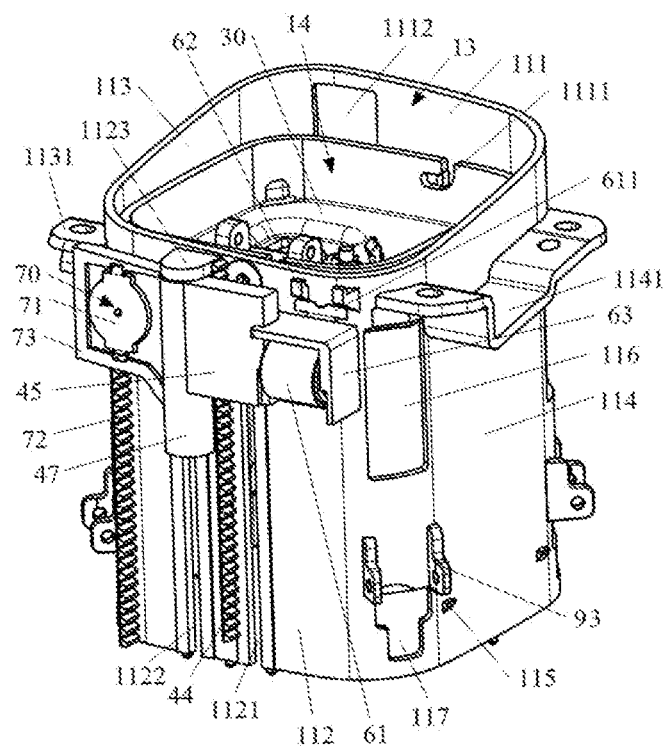
FIG. 6 is a schematic structural diagram of an embodiment of the cup holder assembly according to the disclosure with the cup holder, a lifting mechanism, an angle adjusting mechanism, and a clamping mechanism removed.

FIG. 1 is a first schematic structural diagram of an embodiment of a cup holder assembly according to the disclosure; FIG. 2 is a second schematic structural diagram of an embodiment of the cup holder assembly according to the disclosure; FIG. 3 is a third schematic structural diagram of an embodiment of the cup holder assembly according to the disclosure; FIG. 4 is a first schematic structural diagram of an embodiment of the cup holder assembly according to the disclosure with a cup holder removed; FIG. 5 is a second schematic structural diagram of an embodiment of the cup holder assembly according to the disclosure with the cup holder removed; and FIG. 6 is a schematic structural diagram of an embodiment of the cup holder assembly according to the disclosure with the cup holder, a lifting mechanism, an angle adjusting mechanism, and a clamping mechanism removed. As shown in FIGS. 1 to 6, in one or more embodiments, the cup holder assembly 1 according to the disclosure comprises components such as a mounting barrel 10, a cup holder 20, a synchronizer disc 30, a lifting mechanism 40, an angle adjusting structure 50, a reset mechanism 60, a buffer structure 70, a locking mechanism 80, and a clamping mechanism 90. Alternatively, the cup holder assembly 1 may also be configured in another suitable form, for example, the cup holder assembly comprises only the mounting barrel 10, the cup holder 20, the synchronizer disc 30, the lifting mechanism 40, the angle adjusting structure 50, the reset mechanism 60, and the locking mechanism 80 among the above components.

As shown in FIGS. 1 to 3, the mounting barrel 10 comprises a circumferential wall 11 extending in a vertical direction and a base 12 located at a lower portion of the circumferential wall 11. The circumferential wall 11 and the base 12 may be separately molded by using a suitable resin material (such as ABS, PP) by means of an injection molding process and are then fixed. The mounting barrel 10a has a front portion 10a and a rear portion 10b that are opposite each other. Based on an orientation as shown in FIG. 1, the front portion 10a is located on a left side, and the rear portion 10b is located on a right side. The circumferential wall 11 comprises a front wall 111, a left wall 113, a rear wall 112, and a right wall 114 that are connected in sequence to enclose an accommodating cavity 14 (see FIGS. 4 to 6) extending in the vertical direction. The front wall 111 is located at the front portion 10a of the mounting barrel 10, the rear wall 112 is located at the rear portion 10b of the mounting barrel 10, the left wall 113 is located on the left side of the mounting barrel 10, and the right wall 114 is located on the right side of the mounting barrel. In one or more embodiments, the circumferential wall 11 is fixed to the base 12 by means of snap-fitting. Specifically, the left wall 113 is provided with two snap-fit blocks 115 spaced apart from each other in a front-rear direction, and the right wall 114 is also provided with two snap-fit blocks 115 spaced apart from each other in the front-rear direction. Two skirts 122 extending vertically upward are arranged on each of a left side and a right side of a base body 121 of the base 12. One snap-fit hole 1221 which can match with a corresponding snap-fit block 115 is formed in each of the skirts 122, so that the circumferential wall 11 can be conveniently snap-fitted to the base 12. Alternatively, the circumferential wall 11 may also be fixed to the base 12 by means of a screw or another suitable fixing manner.

Still referring to FIG. 5, in one or more embodiments, a left mounting support 1131 extending substantially in the front-rear direction is formed on the left wall 113. A plurality of mounting holes spaced apart from each other are formed in the left mounting support 1131. Accordingly, in one or more embodiments, a right mounting support 1141 extending substantially in the front-rear direction is also formed on the right wall 114. A plurality of mounting holes spaced apart from each other are also formed in the right mounting support 1141. The provision of the left mounting support 1131 and the right mounting support 1141 enables the entire cup holder assembly 1 to be conveniently fixed to a predetermined device (such as a vehicle) by means of a mounting member (such as a screw, a nut).

Still referring to FIGS. 4 to 6, the mounting barrel 10 has a top opening 13 obliquely extending downwards from the front portion 10a to the rear portion 10b. The top opening 13 has a substantially square shape with rounded corners. Alternatively, the top opening 13 may also be configured in a circular shape or another suitable shape.

Figure 7:
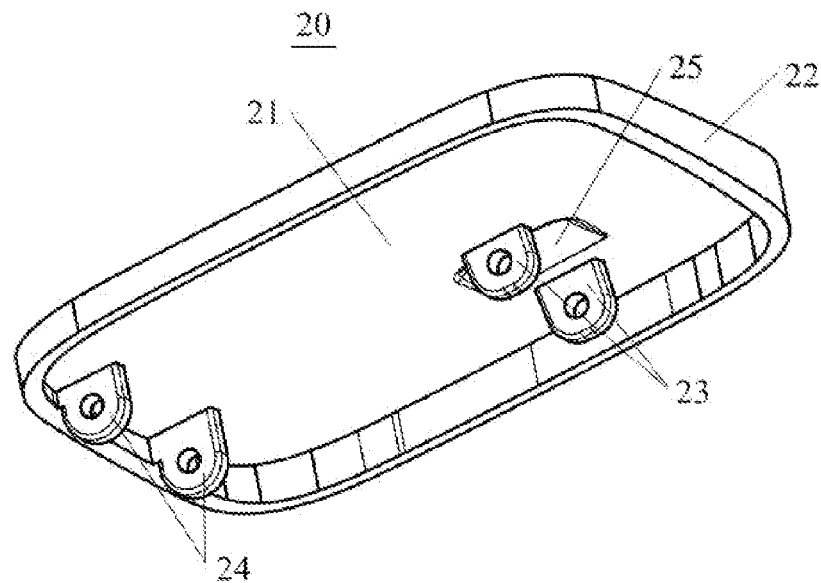
FIG. 7 is a schematic structural diagram of an embodiment of the cup holder in the cup holder assembly according to the disclosure.

FIG. 7 is a schematic structural diagram of an embodiment of the cup holder in the cup holder assembly according to the disclosure. As shown in FIG. 7, in one or more embodiments, the cup holder 20 comprises a cup holder body 21 in a substantially square shape with rounded corners and a cup holder peripheral wall 22 extending perpendicularly downwards from a circumferential edge of the cup holder body 21. The cup holder 20 may be made of a suitable resin material by means of an injection molding process. The cup holder 20 is fixed in the accommodating cavity 14 in a liftable manner. The cup holder 20 has a relative initial position and operating position. The "initial position" refers to an inclined position in which the cup holder is located at the top opening 13 and the cup holder 21 extends substantially in a direction of the top opening 13. The "operating position" refers to a position in which the cup holder is located in the accommodating cavity 14 and extends substantially in a horizontal direction. A predetermined angle is formed between the initial position and the operating position. In one or more embodiments, the predetermined angle is less than or equal to 15°. Further, the predetermined angle ranges from 8° to 12°. With the above arrangement, when the cup holder 20 is in the initial position, not only can the top opening 14 be substantially closed, so as to prevent an internal component from being exposed to the outside and affecting the appearance, but an inclined profile can also meet personalized and aesthetic requirements of an appearance design. In addition, when the cup holder 20 is in the operating position, the horizontally arranged cup holder 20 can firmly and stably support an item such as a cup, so that the cup holder has a good item placement function.

Still referring to FIG. 7, in one or more embodiments, a first support seat 23 and a second support seat 24 spaced apart from each other in the front-rear direction are formed on a lower surface of the cup holder body 21. The first support seat 23 is positioned close to the front portion 10a, and the second support seat 24 is positioned close to the rear portion 10b. The first support seat 23 comprises two first support seat units spaced apart from each other in a left-right direction, so as to fit with a first rotating shaft 535. Accordingly, the second support seat 24 comprises two second support seat units spaced apart from each other in the left-right direction, so as to fit with a second rotating shaft 311. Alternatively, the positions of the first support seat 23 and the second support seat 24 can also be adjusted to other suitable positions according to actual requirements. For example, the first support seat 23 is positioned on the lower surface of the cup holder body 21 and close to the rear portion 10, and the second support seat 23 is positioned on the lower surface of the cup holder body 21 and close to the front portion 10. In one or more embodiments, an avoidance recess 25 extending perpendicularly upward is also formed in the lower surface of the cup holder body 21. The avoidance recess 25 is located between the two first support seat units to avoid a connector 53 in the angle adjusting mechanism 50.

Figure 8:
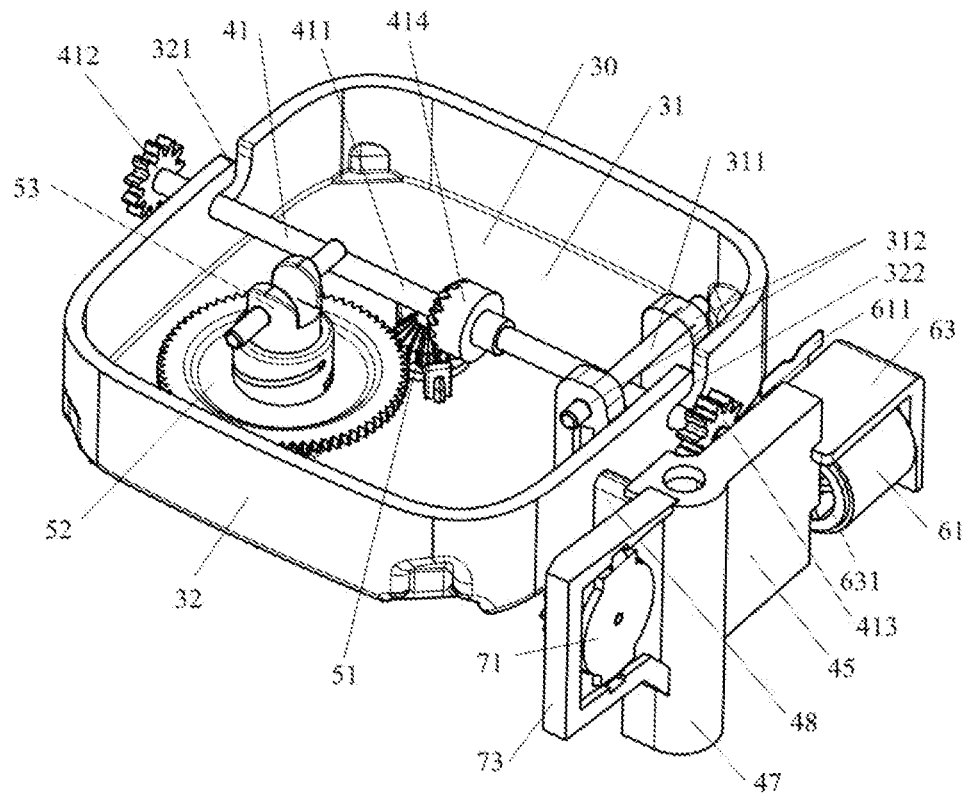
FIG. 8 is a schematic structural diagram of an embodiment of a synchronizer disc, a lifting gear shaft and the angle adjusting mechanism in the cup holder assembly according to the disclosure.

As shown in FIGS. 5 and 6, the synchronizer disc 30 is arranged in the accommodating cavity 14. FIG. 8 is a schematic structural diagram of an embodiment of a synchronizer disc, a lifting gear shaft and the angle adjusting mechanism in the cup holder assembly according to the disclosure. As shown in FIG. 8, in one or more embodiments, the synchronizer disc 30 has a bottom wall 31 in a substantially square shape with rounded corners and a synchronizer disc peripheral wall 32 extending perpendicularly upward from a circumferential edge of the bottom wall 31. The second rotating shaft 311 which can fit with the second support seat 24 of the cup holder 20 is arranged on the bottom wall 31. Specifically, two second rotating shaft mounting bases 312 that are spaced apart from each other in the left-right direction are positioned on the bottom wall 31 close to the rear portion 10*b*. The second rotating shaft 311 is rotatably fixed to the two second rotating shaft mounting bases 312, and two ends of the second rotating shaft 311 are respectively fixed to second support seats 24 of the cup holder 20, so that the cup holder 20 can rotate about a central axis of the second rotating shaft 311, so as to adjust a profile angle of the cup holder 20. Alternatively, the second rotating shaft mounting bases 312 may also be positioned on the bottom wall 31 close to the front portion 10 and spaced apart from each other in the left-right direction, and the second rotating shaft 311 is rotatably fixed to the second rotating shaft mounting bases 312. A front shaft hole 321 is provided at a front side of the synchronizer disc peripheral wall 32, and a rear shaft hole 322 opposite the front shaft hole is provided at a rear side of the synchronizer disc, so as to receive a lifting gear shaft 41 in the lifting mechanism 40, so that the lifting gear shaft 41 is rotatably fixed to the synchronizer disc 30.

As shown in FIG. 6, in one or more embodiments, a front lifting guide slot 1111 extending in the vertical direction is formed in the front wall 111. Accordingly, a rear lifting guide slot 1121 opposite the front lifting guide slot 1111 is formed in the rear wall 112. As shown in FIGS. 4 to 6, in one or more embodiments, the lifting mechanism 40 comprises components such as the lifting gear shaft 41, a front lifting rack 42, and a rear lifting rack 43. Still referring to FIG. 8, the lifting gear shaft 41 is provided with a substantially cylindrical shaft body 411. The shaft body 411 extends through the front lifting guide slot 1111 and the rear lifting guide slot 1121 in the circumferential wall 11, so as to rise and lower in the vertical direction. Meanwhile, the shaft body 411 is rotatably fixed to each of the front shaft hole 321 and the rear shaft hole 322 of the synchronizer disc 30, so that the lifting gear shaft 41 is rotatably fixed to the synchronizer disc 30. Two ends of the shaft body 411 are respectively provided with a front lifting gear 412 and a rear lifting gear 413, so as to fit with the front lifting rack 42 and a rear lifting rack 44. Specifically, the front lifting rack 42 parallel to the front lifting guide slot 1111 is positioned on the front wall 111 close to the front lifting guide slot 1111. A toothing of the front lifting rack 42 faces the front lifting guide slot 1111 and meshes with the front lifting gear 412. Accordingly, the rear lifting rack 44 parallel to the rear lifting guide slot 1121 is positioned on the rear wall 112 close to the rear lifting guide slot 1121. A toothing of the rear lifting rack 44 faces the rear lifting guide slot 1121 and meshes with the rear lifting gear 413. In one or more embodiments, the front wall 111 is also provided with a front cover plate 43 which can cover the front lifting guide slot 1111 and the front lifting rack 42, so as to prevent a component from being exposed and affecting the appearance. In one or more embodiments, a bevel gear 414 is also provided at the middle of the shaft body 411, so as to fit with the angle adjusting mechanism 50.

Figure 10:
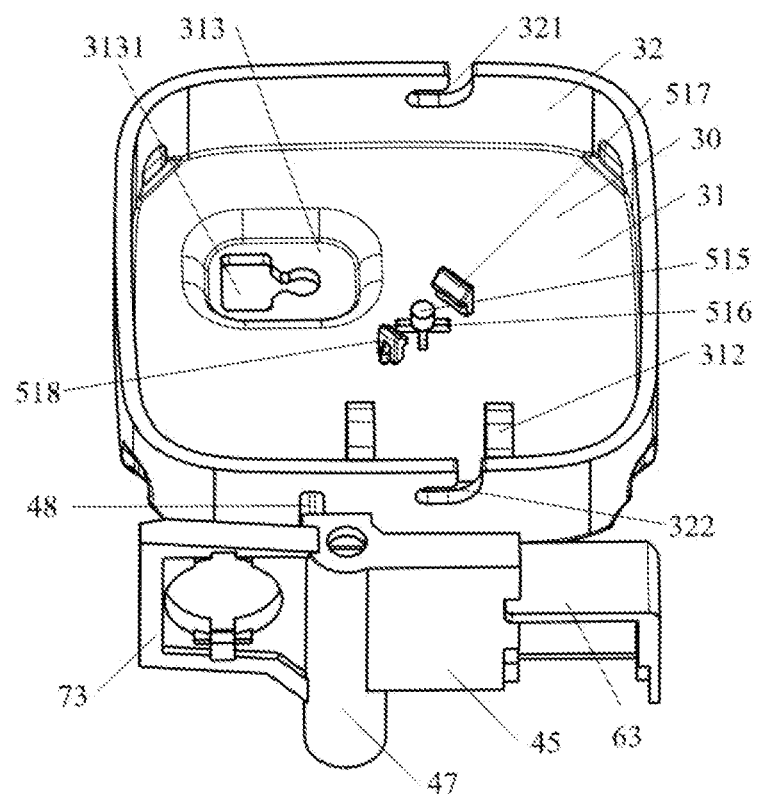
FIG. 10 is a first schematic structural diagram of an embodiment of the synchronizer disc in the cup holder assembly according to the disclosure.

Still referring to FIGS. 5 and 8, in one or more embodiments, a connecting block 48 extending perpendicularly outwards from the rear wall 112 is arranged on the synchronizer disc peripheral wall 32 of the synchronizer disc 30 close to the rear portion 10*b*. Accordingly, a connecting block guide slot 1122 extending in the vertical direction is formed in the rear wall 112, so that the connecting block 48 can be restricted in the connecting block guide slot 1122. A tail end of the connecting block 48 is fixed to a peripheral wall of a guide sleeve 47 extending in the vertical direction. The guide sleeve 47 is a hollow cylinder, which is sleeved on a guide rod 46 extending in the vertical direction. An upper end of the guide rod 46 is fixed to an upper guide rod mounting base 1123 on an upper portion of the rear wall 112, and a lower end of the guide rod 46 is fixed to a lower guide rod mounting base 123 at a corner of the base 12. FIG. 10 is a first schematic structural diagram of an embodiment of the synchronizer disc in the cup holder assembly according to the disclosure. As shown in FIG. 10 and based on an orientation as shown in FIG. 10, in one or more embodiments, a connecting plate 45 is arranged on a right side of the guide sleeve 47, a coil spring mounting support 63 which can accommodate a coil spring 61 of the reset mechanism 60 is arranged on a right side of the connecting plate 45, and a buffer gear mounting support 73 which can accommodate a buffer gear 71 of the buffer mechanism 70 is also arranged on a left side of the guide sleeve 47. With the above arrangement, the synchronizer disc 30, the connecting block 48, the guide sleeve 47, the connecting plate 45, the coil spring mounting support 63, and the buffer gear mounting support 73 can be integrally connected, which can not only facilitate processing and reduce manufacturing costs, but can also make a lifting process of the cup holder 20 connected to the synchronizer disc 30 smoother.

Figure 9:
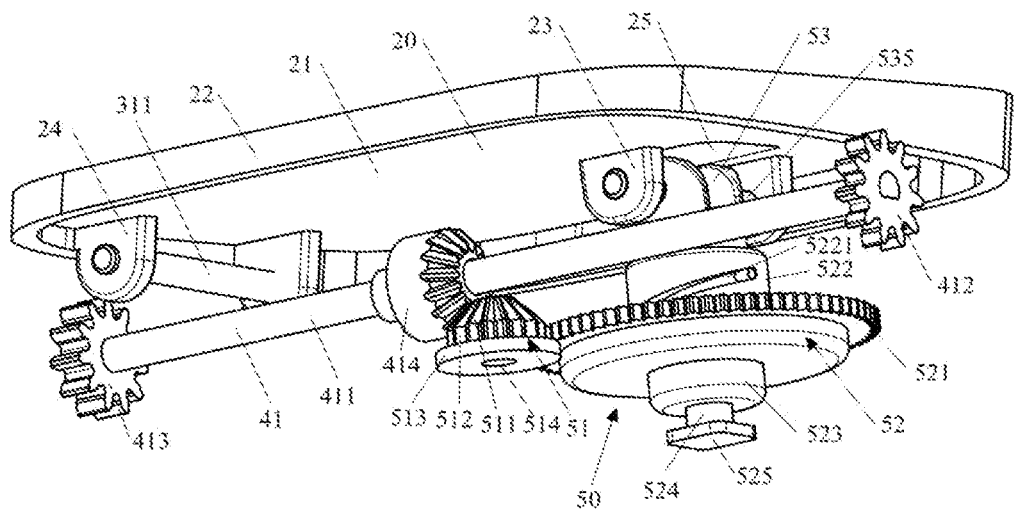
FIG. 9 is a schematic structural diagram of an embodiment of the cup holder, the lifting gear shaft and the angle adjusting mechanism in the cup holder assembly according to the disclosure.

FIG. 9 is a schematic structural diagram of an embodiment of the cup holder, the lifting gear shaft and the angle adjusting mechanism in the cup holder assembly according to the disclosure. As shown in FIGS. 8 and 9, in one or more embodiments, the angle adjusting mechanism 50 comprises components such as a planetary gear 51, a sun gear 52, and a connector 53. The angle adjusting 50 is configured to be connected to each of the cup holder 20, the synchronizer disc 30 and the lifting mechanism 40, so as to adjust the profile angle of the cup holder 20.

Still referring to FIG. 9, in one or more embodiments, the planetary gear 51 comprises a conical tooth portion 511 and a first circumferential tooth portion 512 located below the conical tooth portion 511. The conical tooth portion 511 is configured to mesh with the bevel gear 414 on the lifting gear shaft 41, to implement reversing running fit. The first circumferential tooth portion 512 is configured to extend from a circumferential edge of the conical tooth portion 511, and has a toothing extending substantially in the vertical direction. In one or more embodiments, an annular protrusion 513 extending radially outwards from a circumferential edge of the first circumferential tooth portion 512 is also arranged below the first circumferential tooth portion 512, so that the entire planetary gear 51 has a more stable structure. A shaft hole 514 extending along an axis of rotation of the planetary gear 51 is formed inside the planetary gear, so as to fit with a planetary gear rotating shaft 515 (see FIG. 10) fixed to the bottom wall 31 of the synchronizer disc 30, so that the planetary gear 51 is rotatably fixed to the bottom wall 31. Still referring to FIG. 10, in one or more embodiments, the planetary gear rotating shaft 515 is a cylindrical protrusion extending perpendicularly upward from the bottom wall 31. Preferably, reinforcing ribs 516 arranged in a cross shape are also arranged on the bottom of the cylindrical protrusion, to enhance mechanical strength of the planetary gear rotating shaft 515. In one or more embodiments, the bottom wall 31 is further provided with a first limiting claw 517 and a second limiting claw 518 which are located on two sides of the planetary gear rotating shaft 515 and are arranged opposite each other, so that in an assembled state, the annular protrusion 513 of the planetary gear 51 can be restricted between the first limiting claw 517 and the second limiting claw 518, so as to prevent the planetary gear 51 from being dislocated during rotation and ensure the reliability of components.

Figure 12:
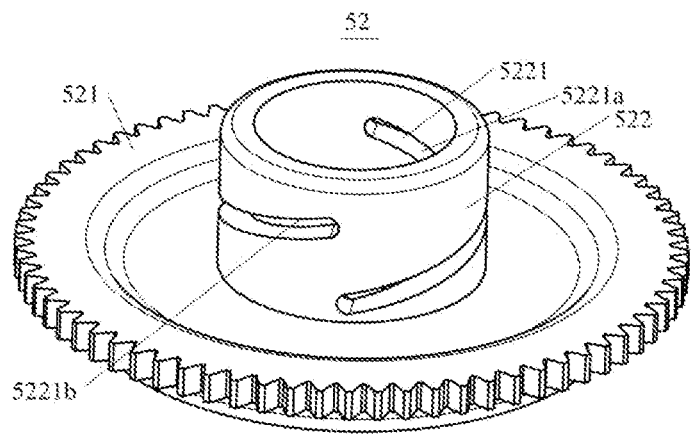
FIG. 12 is a schematic structural diagram of an embodiment of a sun gear in the cup holder assembly according to the disclosure.

FIG. 12 is a schematic structural diagram of an embodiment of a sun gear in the cup holder assembly according to the disclosure. As shown in FIGS. 9 and 12, in one or more embodiments, the sun gear 52 comprises an annular wall 522, a second circumferential tooth portion 521, and an arc-shaped base 523 which are connected in sequence. The second circumferential tooth portion 521 is provided with a substantially circular body, and a toothing meshing with the first circumferential tooth portion 512 is formed in a circumferential direction of the body. In addition, the second circumferential tooth portion 521 has a greater diameter than the first circumferential tooth portion 512, so that the lifting process with a longer stroke cooperates with an angle adjustment process with a shorter stroke to achieve synchronization. A substantially cylindrical annular wall 522 is formed on a side of the second circumferential tooth portion 521 away from the bottom wall 31 (based on an orientation as shown in FIG. 9, i.e., above). The annular wall 522 is provided with a spiral sliding slot 5221. In one or more embodiments, the sliding slot 5221 comprises a first sliding slot 5221a and a second sliding slot 5221b that are opposite each other, so as to fit corresponding sliders 532 in the connector 53. The arc-shaped base 523 is formed on a side of the second circumferential tooth portion 521 close to the bottom wall 51 (based on the orientation as shown in FIG. 9, i.e., below), and a shaft hole (not shown in the figure) extending along an axis of rotation of the arc-shaped base 523 is formed in a central portion of the arc-shaped base, so as to fit with a sun gear rotating shaft 524. Specifically, as shown in FIG. 10, a recess 313 extending perpendicularly downwards is formed in the bottom wall 31 of the synchronizer disc 30, so as to receive the arc-shaped base 523 of the sun gear 52. A mounting hole 3131 is formed in the recess 313, so that the sun gear rotating shaft 524 can be fixed to the mounting hole 3131 by means of a fixing block 525 located at the bottom of the sun gear rotating shaft, and then the entire sun gear 52 is rotatably fixed to the bottom wall 31. The fixing block 525 may be fixed to the mounting hole 3131 by means of clamping, a screw, or another suitable fixing manner.

Figure 13:
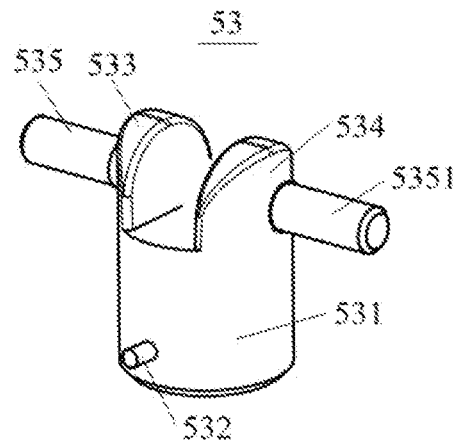
FIG. 13 is a schematic structural diagram of an embodiment of a connector in the cup holder assembly according to the disclosure.

FIG. 13 is a schematic structural diagram of an embodiment of a connector in the cup holder assembly according to the disclosure. As shown in FIGS. 9 and 13, in one or more embodiments, the connector 53 comprises a substantially cylindrical columnar body 531. The columnar body 531 can be inserted into the annular wall 522 of the sun gear 52. A slider 532 extending perpendicularly outwards is arranged on a circumferential wall of the columnar body 531. The slider 532 is configured to be inserted and restricted in the sliding slot 5221 of the annular wall 522. In one or more embodiments, the slider 532 comprises a first slider and a second slider (not shown in the figure) which are located on two sides of the columnar body 531 and are symmetrically arranged, so as to fit with the corresponding first sliding slot 5221a and second sliding slot 5221b in the annular wall 522, so that the connector 53 is stressed more evenly. A first rotating shaft 535 is arranged on an upper portion of the connector 53. The first rotating shaft 535 has an axis of rotation parallel to the second rotating shaft 311, that is, in the assembled state, the first rotating shaft 535 extends substantially in the left-right direction of the mounting barrel 10. Two ends of the first rotating shaft 535 are respectively rotatably fixed to the corresponding first support seats 23 of the cup holder 20. In one or more embodiments, a first lug 533 and a second lug 534 that are spaced apart from each other are formed on an upper portion of the columnar body 531, the first rotating shaft 535 comprises two rotating shaft portions which are separated from each other, and the two rotating shaft portions are circular shafts 5351 which are respectively fixed to the first lug 533 and the second lug 534. The circular shafts 5351 are respectively rotatably fixed to the corresponding first support seats 23 of the cup holder 20. Alternatively, the first rotating shaft 535 may also be configured as a circular shaft passing through the first lug 533 and the second lug 534, and two ends of the circular shaft are rotatably fixed to the corresponding first support seats 23.

When the cup holder 20 is subjected to a vertically downward external force in the initial position, the synchronizer disc 30 connected to the cup holder 20 is stressed to move downward, so that the lifting gear shaft 41 of the lifting mechanism 40 rotates in cooperation with the front lifting rack 42 and the rear lifting rack 44. In this process, the bevel gear 414 on the lifting gear shaft 41 drives the planetary gear 51 in the angle adjusting mechanism 50 to rotate, and the planetary gear 51 drives the sun gear 52 to rotate slowly. At the same time, the spiral sliding slot 5221 in the sun gear 52 slides relative to the slider 532 in the connector 53 during rotation. When the second rotating shaft 311 is arranged close to the rear portion 10b of the mounting barrel 10, since the cup holder 20 is fixedly connected to the synchronizer disc 30 by means of the second rotating shaft 311, the cup holder 20 close to the front portion 10a of the mounting barrel 10 moves in a direction close to the synchronizer disc 30, so that the cup holder 20 rotates about the second rotating shaft 311 while rising and lowering, thereby implementing the movement from the inclined initial position to the horizontal operating position. Accordingly, when the second rotating shaft 311 is arranged close to the front portion 10a of the mounting barrel 10, the cup holder 20 close to the rear portion 10b of the mounting barrel 10 moves in a direction away from the synchronizer disc 30, which can also implement the adjustment of the profile angle of the cup holder 20 while rising and lowering.

As shown in FIGS. 1, 5 and 6, the reset mechanism 60 in the cup holder assembly 1 according to the disclosure comprises the coil spring 61 fixed to the coil spring mounting support 63. The coil spring 61 may be made of stainless steel or another suitable material, so that the coil spring has a good elastic recovery capability. Referring to FIG. 5, the coil spring mounting support 63 is provided with a winding rod 631 extending in the left-right direction. Two coil spring fixing blocks 62 spaced apart from each other in the left-right direction are arranged on the upper portion of the rear wall 112. The coil spring 61 is wound around the winding rod 631, and has a first end fixed to the winding rod 631 and a second end fixed to the coil spring fixing block 62. With the above arrangement, when the cup holder 20 moves downwards under an external force, the coil spring 61 connected to the synchronizer disc 30 is synchronously extended. When the external force (including a locking action of the locking mechanism 80) on the cup holder 20 is released, the coil spring 61 retracts under its own stress, thereby driving the synchronizer disc 30 and the cup holder 20 connected to the synchronizer disc 30 to reset upward to the initial position.

As shown in FIGS. 1, 5 and 6, the buffer mechanism 70 in the cup holder assembly 1 according to the disclosure comprises the buffer gear 71 fixed to the buffer gear mounting support 73 and a buffer rack 72 meshing with the buffer gear 71. The buffer gear 71 is rotatably fixed to the buffer gear mounting support 73. A fixing manner includes, but is not limited to, clamping, fixing by means of a screw, etc. The buffer rack 72 is fixed to the rear wall 112 in the vertical direction, with a toothing facing the buffer gear 71 so as to fit with the buffer gear. With the provision of the buffer gear 71 and the buffer rack 72 having appropriate friction coefficients, the lifting process of the cup holder 20 can be smoother.

Figure 11:
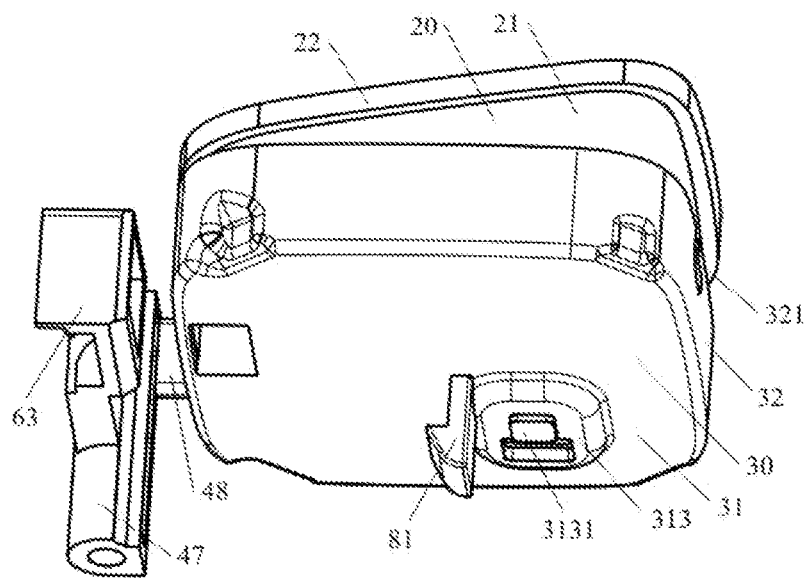
FIG. 11 is a second schematic structural diagram of an embodiment of the synchronizer disc in the cup holder assembly according to the disclosure.
Figure 14:
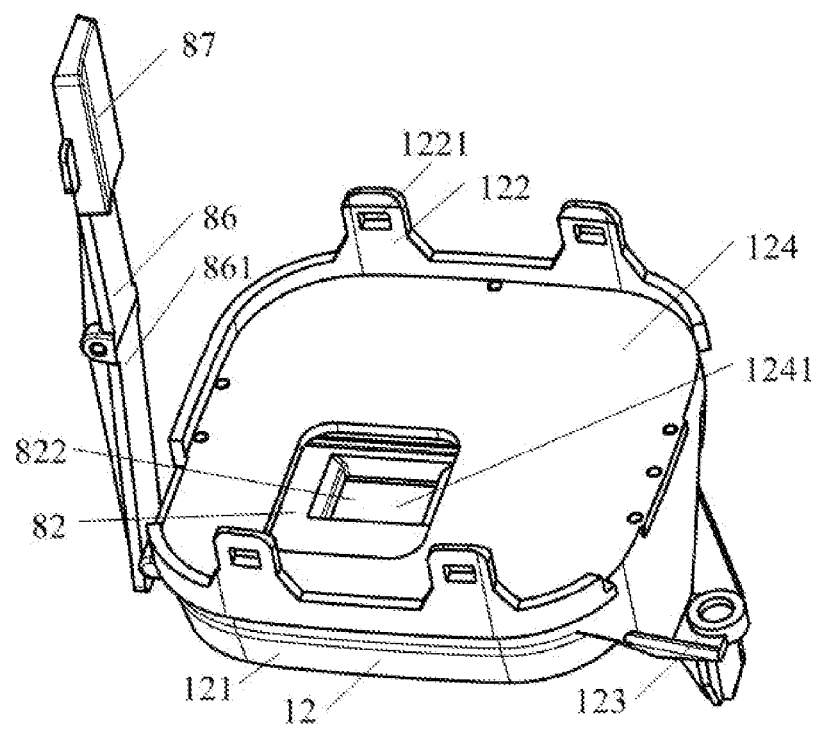
FIG. 14 is a schematic structural diagram of an embodiment of a base and a control rod in the cup holder assembly according to the disclosure.

FIG. 11 is a second schematic structural diagram of an embodiment of the synchronizer disc in the cup holder assembly according to the disclosure; FIG. 14 is a schematic structural diagram of an embodiment of a base and a control rod in the cup holder assembly according to the disclosure. As shown in FIGS. 1 to 4, 11 and 14, in one or more embodiments, the locking mechanism 80 in the cup holder assembly 1 according to the disclosure comprises components such as a locking member 81, a locking plate 82, a control rod 86, and a switch button 87. As shown in FIG. 11, the locking member 81 comprises a body extending perpendicularly downwards from a lower surface of the bottom wall 31 of the synchronizer disc 30 and a locking protrusion (not marked in the figure) extending leftward from the body. The locking member 81 is configured to be fit with a locking hole 822 in the locking plate 82, so as to stably limit the cup holder 20 in a preset operating position. As shown in FIG. 3, the locking plate 82 comprises a substantially rectangular locking plate body 821. The locking plate body 821 is arranged below a bottom plate 124 of the base 12. Specifically, a lower surface of the bottom plate 124 is provided with two locking plate limiting plates 83 spaced apart from each other in the left-right direction of the mounting barrel 10, and the locking plate body 821 is movably arranged between the two locking plate limiting plates 83. In one or more embodiments, a limiting block 823 extending in the left-right direction of the mounting barrel 10 is also arranged on a lower surface of the locking plate body 821. The limiting block 823 is configured to cooperate with the locking plate limiting plate 83 to limit the position of the locking plate 82. A substantially rectangular locking hole 822 is formed in a central portion of the locking plate body 821, and a through hole 1241 corresponding to the locking hole 822 is also formed in the bottom plate 124 of the base 12, so that the locking member 81 can pass through the through hole 1241 and the locking hole 822 in sequence and be snap-fitted to the locking plate body 821. In one or more embodiments, a reset spring 84 enabling the locking plate to reset is also arranged at a right end of the locking plate 82. Specifically, a spring connecting block 824 is formed at a right end of the locking plate body 821, and a spring mounting plate 85 spaced apart from the spring connecting block 824 in the front-rear direction of the mounting barrel 10 is arranged on the bottom plate 124 of the base 12. The reset spring 84 is arranged between the spring connecting block 824 and the spring mounting plate 85, and extends substantially in the front-rear direction of the mounting barrel 10. A left end of the locking plate 82 is configured to be pivotally connected to the control rod 86. As shown in FIG. 4, the control rod 86 is provided with a control rod body 861 extending substantially in a pivoting direction. The front wall 111 is provided with control rod support seats 862 located on two sides of the control rod body 861, so that the control rod body 861 can rotate about a rotating shaft on the control rod support seat 862, thereby driving the locking plate 82 to slide forward and backward. In one or more embodiments, a substantially rectangular switch button 87 is formed at a top end of the control rod body 861, and the front wall 111 is provided with a button opening 1112 which can accommodate the switch button 87. A user can conveniently apply an external force to the control rod body 861 by pressing the switch button 87, so as to drive the locking plate 82 to move.

As shown in FIGS. 1 to 4 and 6, in one or more embodiments, the clamping mechanism 90 in the cup holder assembly 1 according to the disclosure comprises four clamping connecting rods 90a respectively located at four corners of the circumferential wall 11. Each of the clamping connecting rods 90a comprises an upper connecting rod 91 and a lower connecting rod 92 that are pivotally connected to each other. The upper connecting rod 91 is provided with a protruding portion (not marked in the figure) facing the circumferential wall 11. An upper through hole 116 is provided in the circumferential wall 11 opposite the protruding portion, so that the upper connecting rod 91 can extend into the accommodating cavity 14 enclosed by the circumferential wall 11. The lower connecting rod 92 comprises a lower connecting rod body 921 extending substantially vertically and an extension section (not shown in the figure) obliquely extending from a tail end of the lower connecting rod body 921 to the circumferential wall 11. Accordingly, a lower through hole 117 is provided in the circumferential wall 11 opposite the extension section, so that the extension section can extend into the accommodating cavity 14. Connecting rod support seats 93 located on two sides of the lower connecting rod body 921 are also arranged on the circumferential wall 11, so that the entire clamping connecting rod 90a is rotatably fixed to the circumferential wall 11. When the cup holder 20 is in the initial position, the upper connecting rod 91 of the clamping connecting rod 90a is located outside the accommodating cavity 14, and the extension section of the lower connecting rod 92 of the clamping connecting rod 90a is located inside the accommodating cavity 14. When the cup holder 20 moves toward the operating position under the action of an external force, the synchronizer disc 30 located below the cup holder 20 will abut against the extension section of the lower connecting rod 92 and push the extension section out of the accommodating cavity 14. In this process, the protruding portion of the upper connecting rod 91 extends into the accommodating cavity 14 through the corresponding upper through hole 116 under the action of the connecting rod. Therefore, the upper connecting rods 91 located at the four corners of the circumferential wall 11 cooperate with each other to jointly clamp an item such as a cup, so that the item can be stably placed in the accommodating cavity 14.

The disclosure further provides a vehicle (not shown in the figure). The vehicle comprises a cup holder assembly 1 according to any one of the above embodiments. In one or more embodiments, the vehicle is a battery electric vehicle. Alternatively, the vehicle may also be a hybrid vehicle, a fuel vehicle, or another suitable vehicle. The vehicle may be a car, an SUV, an MPV, or another suitable vehicle. The cup holder assembly 1 is arranged in a vehicle body of the vehicle. Specifically, the cup holder assembly 1 is arranged on an auxiliary instrument panel between a driver's seat and a passenger seat, so that the driver and a passenger can conveniently use the cup holder assembly 1. In addition, the cup holder assembly 1 can also play a role in beautification and decoration, thereby improving the beauty of vehicle interiors.

Heretofore, the technical solutions of the disclosure have been described with reference to the preferred implementations shown in the accompanying drawings. However, those skilled in the art can readily understand that the scope of protection of the disclosure is apparently not limited to these specific implementations. Those skilled in the art can make equivalent changes or substitutions to the related technical features without departing from the principle of the disclosure, and all the technical solutions with such changes or substitutions shall fall within the scope of protection of the disclosure.

What is claimed is:

1. A cup holder assembly, comprising:
    a mounting barrel having a circumferential wall extending in a vertical direction and a top opening obliquely extending downwards from a front portion of the mounting barrel to a rear portion of the mounting barrel, the circumferential wall enclosing an accommodating cavity extending in the vertical direction;
    a synchronizer disc arranged in the accommodating cavity;
    a cup holder rotatably fixed to the synchronizer disc and having an axis of rotation extending in a width direction of the cup holder;
    a lifting mechanism connected to the synchronizer disc; and
    an angle adjusting mechanism configured to be connected to each of the cup holder, the synchronizer disc, and the lifting mechanism, so that the cup holder is rotatable about the axis of rotation while rising and lowering in the vertical direction, so as to move between an inclined initial position in which the cup holder is located at the top opening and a horizontal operating position in which the cup holder is located in the accommodating cavity, wherein the angle adjusting mechanism comprises:
        a planetary gear which is rotatably fixed to a bottom wall of the synchronizer disc and which comprises a conical tooth portion fitting with the lifting mechanism and a first circumferential tooth portion extending along a circumferential edge of the conical tooth portion;
        a sun gear which is rotatably fixed to the bottom wall and which comprises a second circumferential tooth portion meshing with the first circumferential tooth portion and an annular wall extending along a central axis of the second circumferential tooth portion; and
        a connector which is fixed to the annular wall in a liftable manner and which is provided with a first rotating shaft pivotally connected to the cup holder, the connector comprises a cylindrical columnar body, the columnar body can be inserted into the annular wall of the sun gear.

2. The cup holder assembly according to claim 1, wherein the planetary gear further comprises an annular protrusion extending outwards in a radial direction of the first circumferential tooth portion, and the bottom wall is provided with a first limiting claw and a second limiting claw which are respectively positioned on two sides of the annular protrusion and which are capable of restricting the annular protrusion.

3. The cup holder assembly according to claim 1, wherein a spiral sliding slot is formed in the annular wall, and a slider restricted in the sliding slot is arranged on the connector.

4. The cup holder assembly according to claim 3, wherein the sliding slot comprises a first sliding slot and a second sliding slot that are opposite each other, and the slider comprises a first slider fitting with the first sliding slot and a second slider fitting with the second sliding slot.

5. The cup holder assembly according to claim 1, wherein a recess extending perpendicularly downwards is formed in the bottom wall, and the sun gear is rotatably fixed in the recess.

6. The cup holder assembly according to claim 1, wherein the second circumferential tooth portion has a greater diameter than the first circumferential tooth portion.

7. The cup holder assembly according to claim 1, wherein a first lug and a second lug that are respectively located on a left side and a right side are formed on an upper portion of the connector, the first rotating shaft comprises two rotating shaft portions which are separated from each other, and the two rotating shaft portions are circular shafts which are respectively arranged on the first lug and the second lug and which extend in opposite directions.

8. The cup holder assembly according to claim 1, wherein a second rotating shaft extending along the axis of rotation is positioned on the bottom wall close to the rear portion or the front portion, and a first support seat which is fixable to two ends of the first rotating shaft and a second support seat fixed to two ends of the second rotating shaft are formed on a lower portion of the cup holder.

9. The cup holder assembly according to claim 1, wherein the lifting mechanism comprises a lifting gear shaft fixed to the circumferential wall in a liftable manner, the lifting gear shaft is rotatably fixed to the synchronizer disc, and a bevel gear which can mesh with the conical tooth portion is arranged on the lifting gear shaft.

10. The cup holder assembly according to claim 9, wherein
    a front wall of the circumferential wall is provided with a front lifting guide slot extending in the vertical direction and a front lifting rack facing the front lifting guide slot, and a rear wall of the circumferential wall is provided with a rear lifting guide slot parallel to the front lifting guide slot and a rear lifting rack facing the rear lifting guide slot; and
    the lifting gear shaft is provided with a shaft body extending through the front lifting guide slot and the rear lifting guide slot, and two ends of the shaft body are respectively provided with a front lifting gear meshing with the front lifting rack and a rear lifting gear meshing with the rear lifting rack.

11. The cup holder assembly according to claim 1, wherein an included angle formed between the initial position and the operating position is a predetermined angle, and the predetermined angle is less than or equal to 15°.

12. A vehicle, comprising a cup holder assembly according to claim 1.

* * * * *